United States Patent Office 2,798,883
Patented July 9, 1957

2,798,883

PREPARATION OF ACRYLONITRILE

George L. Christopher, New Canaan, Conn., assignor to American Cyanamid Company, New York, N. Y., a corporation of Maine No Drawing. Application December 19, 1955, Serial No. 553,692

4 Claims. (Cl. 260—465.3)

The present invention relates to the preparation of acrylonitrile. More particularly, it relates to an improved method for the catalytic prepartion of acrylonitrile from HCN and acetylene.

Acrylonitrile is presently one of the more promising chemical intermediates available. It has already proved to be of particular value in the manufacture of a wide range of products, e. g., plastics, synthetic rubbers, synthetic fibers, soil conditioners and the like. Because of the importance of acrylonitrile, great interest exists in methods of its preparation.

One method comprises a liquid phase catalytic reaction of HCN and acetylene. Various catalysts have been suggested for carrying out this reaction. In general, however, the best catalysts are cuprous halides, preferably cuprous chloride. The latter is prapared as an aqueous solution containing, in addition, hydrochloric acid and an ammonium or alkali metal chloride as a solubilizer for the cuprous chloride. To the catalyst solution maintained at a pH of about 0–1.5 and a temperature which may range as high as 110° C., are fed HCN and acetylene. The resultant reaction gas, containing acetaldehyde amongst other impurities, is usually absorbed in an aqueous medium which is then steam stripped to obtain a wet acrylonitrile. This in turn is subjected to various procedures to obtain a final purified product.

For many commercial operations, the permissible content of acetaldehyde in acrylonitrile is low, usually less than 100 p. p. m. One of the problems encountered in the above-described procedure for preparing acrylonitrile, therefore, is the recovery of an acrylonitrile product meeting this high standard of purity. The usual procedure for obtaining such a product is to eliminate much of the acetaldehyde in the steam stripping bottoms as lactonitrile. However, at elevated temperatures, lactonitrile dissociates into acetaldehyde and HCN, so that the wet acrylonitrile produced by steam stripping still contains substantial amounts of acetaldehyde, as well as HCN and lactonitrile. Although procedures have been proposed for further reducing the acetaldehyde content, they are, in general, complex and costly.

It is an object of this invention to improve the procedure for preparing acrylonitrile by the catalytic reaction of HCN and acetylene. It is a further object of this invention to minimize the acetaldehyde content in the acrylonitrile product obtained by said procedure.

In accordance with this invention, these objects have been met in a surprisingly simple yet effective manner. As indicated above, the prior art, in general, attempted to obtain an acceptably acetaldehyde-free acrylonitrile product by purification of a highly acetaldehyde-contaminated crude product. In contrast, the instant invention is directed to reducing the acetaldehyde content by minimizing the formation of this by-product in the first place. This has the additional effect of eliminating the decrease in acrylonitrile yield based on acetylene which accompanies acetaldehyde formation. In general, this is quite unexpectedly obtained by having present in the aqueous reaction medium an acetaldehyde formation retarding agent selected from the group consisting of 2-pyrrolidone and urea.

The use of an anhydrous catalyst medium in which HCN and acetylene can be reacted to produce acrylonitrile free of acetaldehyde is known. Nevertheless, the results obtained by the present invention are the more surprising in view of this knowledge since the retarding effect is far more than would be expected merely on the basis of replacement of part of the water content of the catalyst solution with an equal part of a retarder of this invention. The action producing these results, moreover, appears to be unique to the retarding agents of this invention. Thus the use of various other organic amides proved to have little or no effect.

The amount of retarder may be varied considerably. Substantial decrease in the yield of acetaldehyde is obtained using as little as 0.5 mol percent of the retarder based on the water content of the catalyst solution. More substantial decreases in acetaldehyde yields are obtained through the use of greater amounts of retarder. The use of more than about 25 mol percent of retarder, however, is not recommended. Any added decrease in acetaldehyde content so obtained is so small as to be unwarranted by the loss of the advantages derived through the use of a substantially aqueous system. For optimum results, therefore, the amount of retarder employed should be from about 1–10 mol percent and preferably from about 2–8 mol percent.

The process of this invention is further illustrated by the following examples. These examples are not to be considered as restrictive.

EXAMPLES 1–5

A series of catalyst solutions is prepared each containing 5 mols of CuCl, 1 mol CuCN, 4.5 mols of HCl, and amounts of 2-pyrrolidone and water as indicated in Table I. Into each solution is then passed a mixture of acetylene and HCN, the reaction temperature being maintained at about 90° C. The reaction gas produced from each reaction is then passed through a countercurrent scrubber and the resultant aqueous solutions separately analyzed for acrylonitrile and acetaldehyde. Results appear in Table I.

*Table I*

| | Catalyst solution | | | Product | | |
|---|---|---|---|---|---|---|
| Ex. No. | Pyrrolidone (mol) | $H_2O$ (mol) | Pyrrolidone: $H_2O$ (mol Percent) | Acrylonitrile (gr./l./hr.) | Acetaldehyde (gr./l./hr.) | Acetaldehyde: Acrylonitrile×100 |
| 1 | 0 | 33.4 | 0 | 38 | 3.8 | 10.0 |
| 2 | 0.63 | 30.0 | 2.1 | 35 | 1.85 | 5.3 |
| 3 | 1.0 | 28.6 | 3.5 | 38 | 1.75 | 4.6 |
| 4 | 1.75 | 25.0 | 7.0 | 36 | 0.95 | 2.6 |
| 5 | 3.5 | 16.5 | 21.2 | 35 | 0.6 | 1.7 |

EXAMPLES 6–7

Aqueous catalyst solutions similar to those of Examples 1–5 are prepared except that the pyrrolidone is replaced by urea. The reaction gas obtained by passing through a mixture of acetylene and HCN is absorbed in an aqueous solution which is then analyzed for acrylonitrile and acetaldehyde. Results appear in Table II.

Table II

| Ex. No. | Catalyst Solution | | | Product | | |
|---|---|---|---|---|---|---|
| | Urea (mol) | H$_2$O (mol) | Urea: H$_2$O (mol) | Acrylonitrile H$_2$O (gr./l./hr.) | Acetaldehyde (gr./l./hr.) | Acetaldehyde: Acrylonitrile×100 |
| 6 | 0 | 33.4 | 0 | 38 | 3.8 | 10.0 |
| 7 | 0.75 | 31.4 | 2.4 | 37 | 1.85 | 5.0 |

I claim:

1. In the preparation of acrylonitrile by the catalytic reaction of HCN and acetylene in an aqueous catalyst solution comprising cuprous chloride as catalyst, the improvement in combination therewith for minimizing the formation of by-product acetaldehyde which comprises: having present in said aqueous catalyst solution an acetaldehyde formation retarding agent selected from the group consisting of 2-pyrrolidone and urea in an amount of about 0.5 mol percent–25 mol percent of the water content of the catalyst.

2. The improvement according to claim 1 in which the amount is about 2–8 mol percent.

3. The improvement according to claim 2 in which the retarding agent is 2-pyrrolidone.

4. The improvement according to claim 2 in which the retarding agent is urea.

References Cited in the file of this patent

UNITED STATES PATENTS

| | | |
|---|---|---|
| 2,409,124 | Heuser | Oct. 8, 1946 |
| 2,698,337 | Heider et al. | Dec. 28, 1954 |
| 2,715,137 | Copelin | Aug. 9, 1955 |